United States Patent Office

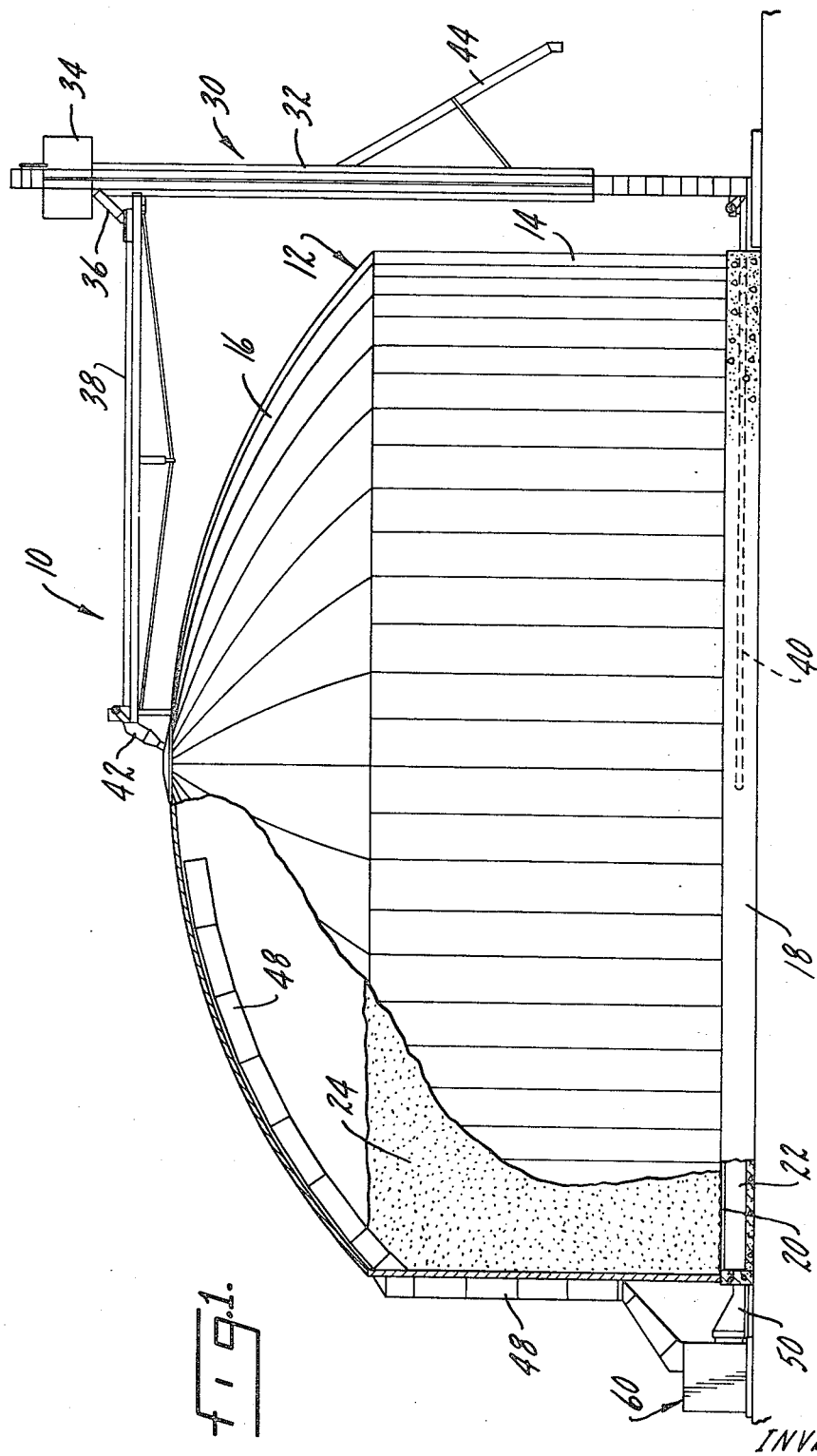

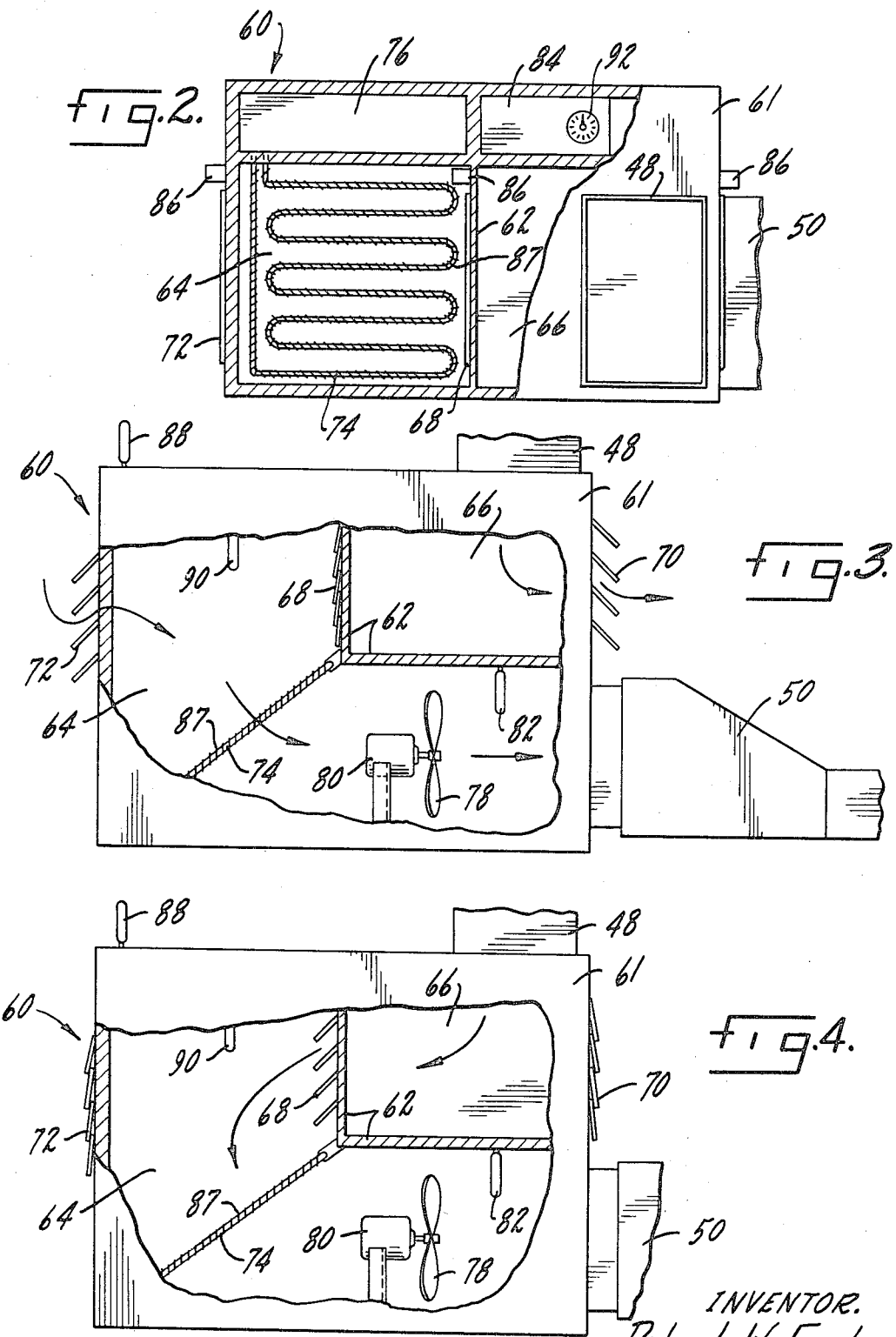

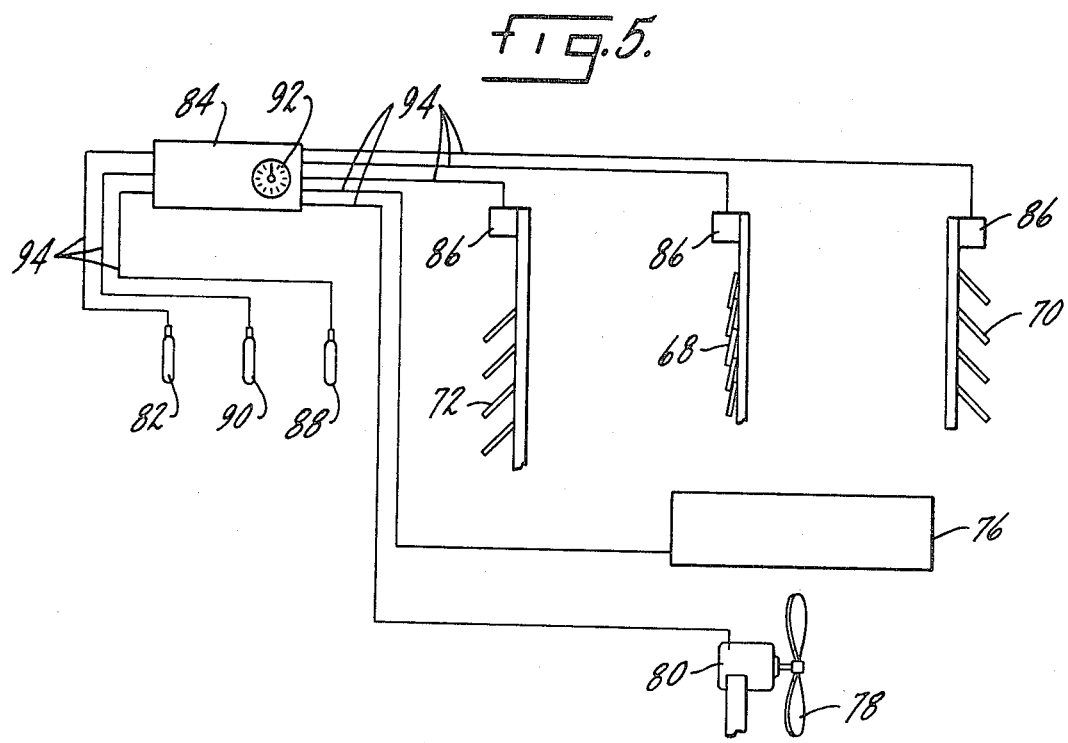

3,546,893
Patented Dec. 15, 1970

3,546,893
CONTROL SYSTEM FOR STORAGE APPARATUS
Robert W. Frudeger, Peoria, Ill., assignor to Frigidome Corporation, Peoria, Ill., a corporation of Delaware
Filed Oct. 23, 1968, Ser. No. 770,000
Int. Cl. F25d 17/06
U.S. Cl. 62—89                                10 Claims

ABSTRACT OF THE DISCLOSURE

Agricultural product, such as shelled corn, is conditioned and stored in an enclosure by first at least partially filling the enclosure with product while delivering outside air to it at a temperature below about 35° F. The product is then conditioned by passing air through it at a temperature below about 29° F. This air is recirculated through the product when the outside air temperature is above about 29° F., and delivered directly to the product when the outside temperature is below about 29° F. Subsequently, the product is held in the enclosure, while air is periodically circulated through it. The temperature of the air returned from the product is sensed, and if it is above about 31° F., air is circulated through the product for a time period long enough to bring the temperature of the return air to a level below about 29° F.

The invention also provides air-conditioning apparatus, basically comprising refrigeration means, variable-speed blower means, and air flow control means for selectively delivering outside or return air through the refrigeration means and to the product. A refrigeration temperature sensor senses the temperature of the refrigerated air, and the blower speed is increased responsive to temperature decreases. Also provided in the preferred embodiment is a return air temperature sensor and an outside air temperature sensor, together with suitable control means to enable the apparatus to carry out the aforementioned method.

---

The present invention relates to an improved method and apparatus for storing and conditioning agricultural products.

Increased yields, larger harvesting machines, and earlier harvesting have all contributed to difficulty in handling and conditioning shelled corn immediately following harvest. It is often uneconomical to install conventional hot-air drying equipment compatible with high daily harvest rates because of the short time involved in harvesting. Furthermore, drying with heated air must take place in a relatively short period of time because the grain temperature and high moisture provides a favorable environment for the growth of harmful molds. It is therefore preferred to rapidly reduce the temperature of the agricultural product to a level that will retard mold formation, followed by slowly reducing the moisture content of the product while maintaining it at a low temperature. When the product has reached the desired temperature and moisture content it is maintained at a relatively constant moisture level and at a low temperature.

Generally, the present invention provides a method and apparatus for conditioning and storing small grain agricultural products, such as shelled corn. The method is carried out in a storage enclosure by at least partially filling it with agricultural product while at the same time delivering air at a temperature below about 35° F. to the product. After the product has been loaded into the storage enclosure, it is conditioned by passing air through it at a temperature below about 29° F. This air is recirculated through the product when the outside temperature is above 29° F., and outside is delivered directly to the product when the outside temperature is below about 29° F. This step results in the cooling of the product together with some drying. Subsequently, the product is held in the enclosure while periodically recirculating air through it and sensing the temperature of the returned air. When the temperature of the return air rises above about 31° F., air cooled to a temperature below about 29° F. is recirculated through the product for a time interval which should ordinarily be long enough to insure that the temperature of the product is brought down to a level below about 29° F.

The present invention also provides improvements in storing and conditioning apparatus of the type having a product storage enclosure, air input means for delivering a stream of air through agricultural product in the enclosure, and air return means for removing air from the enclosure after it has passed through the product. In the improvement of the present invention, refrigeration means together with variable speed blower means are provided for passing a stream of air through the refrigeration means and into the air input means of the storage enclosure. The apparatus includes air flow control means for selectively delivering outside air or air from the air return means to the refrigeration means and blower means. A temperature sensor is included between the refrigeration means and the air input means to sense the temperature of the air for before it enters the storage enclosure. Control means are operatively connected to the blower means for increasing its speed responsive to decreases in temperature at the temperature sensor, and conversely for increasing the speed responsive to decreases in temperature at the temperature sensor.

The invention, together with the construction and the method of operation of the preferred embodiments, will be best understood by reference to the following detailed description, taken in conjunction with the drawings in which:

FIG. 1 is an elevation view of a storage and conditioning apparatus constructed in accordance with the present invention, partially cut away to show the agricultural product stored therein, together with the air input and return means;

FIG. 2 is a plan view of the air-conditioning means of the present invention, partially cut away to show the interior details thereof;

FIG. 3 is an elevation view of the air-conditioning means of the present invention, shown in the outside air mode;

FIG. 4 is an elevation view similar to FIG. 3, showing the air-conditioning means in the return air mode; and FIG. 5 is a diagrammatic illustration showing the interconnection between various components of the air-conditioning means.

FIG. 1 illustrates an agricultural product storage and conditioning apparatus constructed in accordance with the present invention, and generally indicated by reference numeral 10. In the embodiment shown, the apparatus includes a product storage enclosure 12 having a vertical side wall 14 of generally cylindrical configuration together with a dome-shaped roof 16. While the shape of the enclosure 12 is not critical, it should preferably be one that facilitates the passage of air through the product stored therein.

The enclosure 12 has a foundation 18 of concrete or the like. Mounted on the foundation 18 is a perforated floor 20 having perforations large enough to permit the passage of air, but not large enough to allow agricultural product to pass. The perforated floor 20 is suspended above the base of the foundation 18 in a manner to form an open chamber or plenum 22 beneath the floor 20. Within the enclosure 12, agricultural products such as shelled corn 24 may be stored.

Adjacent to the storage enclosure 12 are product in-load and discharge means, generally indicated by reference numeral 30. The inload and discharge means 30 are of conventional design, and include a bucket elevator 32, an elevator discharge hopper 34 having a spout 36 communicating with a lower portion thereof, an inload conveyor 38, and an outload conveyor 40. The inload conveyor 38 communicates with an inload spout 42 which directs the product into the interior of the enclosure 12. As is well known in the art, product to be inloaded into the enclosure 12 is supplied to the base of the bucket elevator 32, which carries it up to the hopper 34. The product flows out of the hopper 34 through the spout 36, along the moving conveyor 38, through the inload spout 42, and into the interior of the storage enclosure 12. To withdraw product, remote-controlled product release means (not shown), such as a shut-off gate, at the center of the floor 20 is opened and product drops down onto the outload 40. It is carried by this conveyor out to the base of the elevator 32, where it is again carried up to the discharge hopper 34. Of course, the outload conveyor 40 is suitably enclosed so that it does not produce any significant air leakage in the plenum 22. Diversion means (not shown) are provided in the discharged hopper 34, so that product can be diverted from the spout 36 into an outload conduit 44, also communicating with the base of the discharge hopper 34. The product is then discharged through the outload conduit 44 into a suitable container or directly into a truck or railroad car.

Air return means are located within the enclosure 12. In the preferred embodiment, these return means comprise an air return duct 48 communicating with an upper portion of the storage enclosure 12. An air input duct 50 communicates with the plenum 22 at the base of the enclosure 12. Taken together, the air input duct 50, plenum 22, and perforated floor 20 make up air input means for delivering a stream of air through agricultural product in the enclosure. Since the incoming air will generally be warmed by the product in the enclosure 12, it preferable to deliver the air into the enclosure 12 through input means at the bottom, and to withdraw it through return means at the top. This also enables the product which was first inloaded to be first cooled, which is important if the formation of mold is to be avoided.

In accordance with the present invention, the apparatus 10 includes an air-conditioning unit, generally indicated by reference numeral 60. Referring to FIGS. 2–4, the air-conditioning enclosure 61 has an internal partition 62, separating it into a refrigeration compartment 64 and a return air compartment 66. In the embodiment shown, the partition 62 is made up of a pair of connected walls, although this particular configuration is not critical.

As shown in FIGS. 3 and 4, the partition 62 has air flow control means, which, in the preferred embodiment are movable louvers 68. For convenience in describing the present invention, the louvers 68 and the partition 62 will be referred to herein as the "first" louvers 68. The air-conditioning enclosure 61 has air flow control means between the return air compartment 66 and the exterior. These are also movable louvers, and for convenience will be referred to herein as the "second" louvers 70. Finally, a set of "third" louvers 72, which are also movable, provide communication between the exterior of the air-conditioning means 60 and the refrigeration compartment 64.

Suitable refrigeration means, in this instance conventional evaporation or refrigeration coils 74, are located within the refrigeration compartment 64. As shown in FIG. 2, these refrigeration coils 74 are connected to a suitable compressor and heat exchanger of conventional design, designated by reference numeral 76.

A fan 78 having a variable-speed motor 80 is mounted in the refrigeration compartment 64, and positioned for passing air over the refrigeration coils 74 and into the air input duct 50.

As shown in FIGS. 3 and 4, a refrigeration temperature sensor 82 is positioned within the refrigeration compartment 64 at a point between the air input duct 50 and the refrigeration coils 74. This refrigeration temperature sensor 82 is best positioned to sense the temperature of air which has been cooled by the coils 74, before it is delivered to the product storage enclosure 12. The refrigeration temperature sensor 82 transmits a signal to a control unit 84, which is operatively connected to the variable-speed motor 80. The control unit 84 operates to increase the speed of the fan 78 responsive to a decrease of temperature below a predetermined level at the refrigeration temperature sensor 82, and to decrease the fan speed responsive to a temperature increase. In this manner, the refrigeration coils 74 will constantly be operating at their maximum capacity.

As shown in FIG. 2, each set of louvers 68, 70, 72 has actuating means such as a two-position damper actuator 86 operatively connected to open or close the louvers. These actuators 86 operate responsive to a signal from the control unit 84 to select an outside air mode, a return air mode, or a defrost mode.

The outside air mode is illustrated in FIG. 3. In this mode, the first louvers 68 are closed while the second and third louvers 70, 72, respectively, are open. In this mode, as shown by the arrows in FIG. 3, outside air is drawn past the refrigeration coils 74 and delivered to the air input duct 50. At the same time, return air from the air return duct 48 is simply vented to the atmosphere through the second louvers 70.

The return air mode is illustrated in FIG. 4. In this mode, the second and third louvers 70, 72 respectively, are closed, and the first louvers 68 are open. In this mode, air from the return air duct 48 is delivered from the return air compartment 66 to the refrigeration compartment 64, wherein it is passed across the refrigeration coils 74 and redelivered to the plenum 22 through the air input duct 50.

The defrost mode is employed when necessary to remove ice from the refrigeration coils 74. In this mode, which is not illustrated in the drawings, all of the louvers 68, 70, 72 are closed, and the compressor 76 is shut down. In the most preferred embodiment, a heating element such as an electrical resistance wire 87 on the refrigeration coils 74, is activated to rapidly remove ice.

In the preferred embodiment, the apparatus of the present invention includes an outside air temperature sensor 88 located on the exterior of the air-conditioning enclosure 61. This outside air temperature sensor 88 is connected to the control unit 84 to initiate the shutdown of the refrigeration compressor 76, and to select the outside air mode when the outside temperature falls below a predetermined level. Ordinarily, the outside air mode will be selected only during the inload and conditioning cycles, and not during the holding cycle, regardless of the outside temperature.

In its most preferred embodiment, the apparatus of the present invention also includes a return air temperature sensor 90 which is positioned within the air-conditioning enclosure 61 between the air return duct 48 and the refrigeration coils 74.

In operation, during the inloading of agricultural product, when the outside air temperature is above a predetermined level, generally about 35° F., the air-conditioning means 60 is set for the aforementioned outside air mode, as discussed above and illustrated in FIG. 3. If the outside temperature is below 35° F., as sensed by the outside air temperature sensor 88, the compressor 76 is shut off, and the cold outside air is delivered directly to the product enclosure 12.

After the product has been loaded into the enclosure 12, the conditioning cycle is initiated. During this cycle, air having a temperature below about 29° F. is delivered to the product. If the outside temperature is above about 29° F., the return air mode is selected, wherein air is continuously recirculated through the product. On the other hand, if the outside air temperature is below about 29° F., outside air is delivered directly to the product as hereinbefore described.

After the product has been brought to the desired temperature and moisture content, a holding cycle is initiated. In this cycle, the air-conditioning unit 60 will normally be shut down, and the louvers will be adjusted in the return air mode as shown in FIG. 4. Periodically, say every three hours, a timer 92 in the control unit 84 will turn on the fan 78 and initiate the sensing of the temperature of the return air at the return air temperature sensor 90. If this return air is above a predetermined temperature, in this instance 31° F., return air below about 29° F. is circulated past the operating refrigeration coils 74 for a time interval sufficient to lower the return air temperature to below about 29° F. The unit is then shut down again for another interval, normally about three hours, and the temperature of the return air is again sensed as before. If the temperature of the return air is at or below the aforesaid predetermined level, the unit will immediately be shut off until the timer 92 again initiates the sensing of return air.

From time to time, particularly when humid air is being cooled, the refrigeration coils 74 may become caked with ice. When this occurs, the defrost mode is initiated.

As those skilled in the art will understand, more than one air-conditioning unit 60 will be employed in many installations, especially where the storage enclosure 12 is of a large size. These air-conditioning units may either be totally independent, or may be controlled by a common control unit.

FIG. 5 is a diagrammatic illustration showing the interconnection between the control unit 84 and the temperature sensors 82, 88, 90, the compressor 76, the fan motor 80, and the damper actuators 86, for the various louvers 68, 70, 72. In the embodiment shown, these interconnections are by means of electric wires 94, although, as those skilled in the art will understand, other means, such as fluidic means may be employed for these interconnections.

Obviously, many modifications and variations of the present invention as hereinbefore set forth will occur to those skilled in the art, and it is intended to cover in the appended claims all such modifications and variations as fall within the true spirit and scope of the invention.

I claim:

1. A method for conditioning and storing agricultural products in a product storage enclosure comprising: at least partially filling said enclosure with agricultural product while delivering outside air to said product in said enclosure at a temperature below about 35° F.; conditioning said agricultural product by passing air through said product at a temperature below about 29° F., said air being recirculated through said product when the outside temperature is above 29° F., and outside air being delivered directly to said product when the outside temperature is below about 29° F.; and subsequently holding said product in said enclosure while periodically recirculating air through said product, and sensing the temperature of the air returned from said product; and circulating air at a temperature below about 29° F. through said product when the temperature of said return air rises above about 31° F., to lower the temperature of said product to below about 29° F.

2. The method as defined in claim 1 wherein said agricultural product is shelled corn.

3. In an apparatus for conditioning and storing agricultural products of the type comprising a product storage enclosure, air input means for delivering a stream of air through agricultural product in said enclosure, and air return means for removing air from said enclosure, the improvement comprising: refrigeration means; variable speed blower means for passing a stream of air through said refrigeration means and into said air input means; air flow control means for selectively delivering outside air or air from said air return means to said refrigeration means and said blower means; a refrigeration temperature sensor between said refrigeration means and said air input means; and blower control means for increasing the speed of said blower responsive to decreases in temperature at said temperature sensor.

4. The apparatus as defined in claim 3 further including an outside air temperature sensor; and means for automatically shutting off said refrigeration means and for selecting the delivery of outside air at said air flow control means when the temperature at said outside air temperature sensor falls below a predetermined level.

5. The apparatus as defined in claim 4 further including a return air temperature sensor between said air return means and said refrigeration means; and means including a timer for periodically initiating sensing of the temperature at said return air temperature sensor during a holding cycle wherein said flow control means are positioned to deliver air from said air return means.

6. In an apparatus for storing and conditioning agricultural products of the type comprising a product storage enclosure, air input means for delivering a stream of air through agricultural product in said enclosure, and air return means for removing air from said enclosure, said air having passed through said agricultural product, the improvement being air-conditioning means comprising: an air-conditioning enclosure having an internal partition separating said enclosure into a refrigeration compartment communicating with said air input means and a return air compartment communicating with said air return means; first air flow control means in said partition; second air flow control means between said return air compartment and the exterior of said air-conditioning enclosure; third air flow control means between said refrigeration compartment and the exterior of said air-conditioning enclosure; refrigeration means in said refrigeration compartment; variable-speed blower means for passing air through said refrigeration means to said air input means; a refrigeration temperature sensor in said air-conditioning enclosure between said refrigeration means and said air input means; blower control means for increasing the speed of said blower means responsive to a temperature decrease below a predetermined level at said refrigeration temperature sensor; and actuating means operatively connected to said air flow control means and adapted to select an outside air mode wherein said first air flow control means are closed and said second and third air flow control means are open, a return air mode wherein said first air flow control means are open and said second and third air flow control means are closed, and a defrost mode wherein all of said air flow control means are closed.

7. The apparatus as defined in claim 6 further including an outside air temperature sensor outside said air-conditioning enclosure and means for automatically shutting off said refrigeration means and selecting said outside air mode when the temperature at said outside air temperature sensor falls below a predetermined level.

8. The apparatus as defined in claim 7 further including a return air temperature sensor in said air-conditioning enclosure between said air return means and said refrigeration means; means including a timer for periodically initiating sensing of the temperature at said return air temperature sensor during a holding cycle wherein said flow control means are in said return air mode.

9. In an apparatus for storing and conditioning agricultural products of the type comprising a product storage enclosure, air input means for delivering air through agricultural product in said enclosure, and air return means for removing air from said enclosure, air-conditioning means comprising: an air-conditioning enclosure having an internal partition separating said enclosure into a refrigeration compartment communicating with said air delivery means and a return air compartment communicating with said air return means; first air flow control louvers in said partition; second air flow control louvers between said return air compartment and the exterior of said air-conditioning enclosure; third air flow control louvers between said refrigeration compartment and the exterior of said air-conditioning enclosure; refrigeration coils in said refrigeration compartment; a fan having a variable-speed motor, said fan positioned for passing air over said refrigeration coils to said air input means; a refrigeration temperature sensor in said air-conditioning enclosure between said refrigeration coils and said air input means; fan control means for increasing the speed of said fan responsive to a temperature decrease below a predetermined level at said refrigeration temperautre sensor; an outside air temperature sensor outside said air-conditioning enclosure; a return air temperature sensor in said air-conditioning enclosure between said air return means and said refrigeration means; actuating means operatively connected to said air flow control louvers to select an outside air mode, wherein said first air flow control louvers are closed and said second and third air flow control louvers are open, a return air mode wherein said first air flow control louvers are open and said second and third air flow control louvers are closed, and a defrost mode wherein all of said flow control louvers are closed; cycle control means for automatically shutting off said refrigeration means and selecting said outside air mode when the temperature of said outside air temperature sensor falls below a predetermined level, said cycle control means including a timer for periodically initiating the sensing of the temperature at said return air temperature sensor during a holding cycle wherein said air flow control louvers are in said return air mode.

10. The apparatus as defined in claim 9, further including a heating element on said refrigeration coils.

References Cited

UNITED STATES PATENTS

| 3,009,331 | 11/1961 | Hewett | 62—419 |
| 3,280,473 | 10/1966 | Sullivan | 34—15 |
| 3,426,669 | 2/1969 | Peterschmidt | 34—20 |

WILLIAM J. WYE, Primary Examiner

U.S. Cl. X.R.

34—15, 20, 44; 62—180, 231; 98—55